(12) United States Patent
Tidrow et al.

(10) Patent No.: US 6,910,261 B1
(45) Date of Patent: Jun. 28, 2005

(54) METHOD OF FABRICATING A COLOSSAL MAGNETO-RESISTIVE DETECTOR USING A THIN FILM TRANSFER METHOD

(75) Inventors: Meimei Z. Tidrow, Annandale, VA (US); Steven Tidrow, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 88 days.

(21) Appl. No.: 10/805,669

(22) Filed: Mar. 22, 2004

Related U.S. Application Data

(62) Division of application No. 09/550,623, filed on Apr. 17, 2000, now Pat. No. 6,708,392.

(51) Int. Cl.[7] .......................... H01C 17/28; H05K 3/36
(52) U.S. Cl. .......................... 29/621; 29/830; 29/832; 29/842; 29/418
(58) Field of Search .......................... 250/338.1, 338.2, 250/338.3; 257/310; 427/79, 80, 81, 100, 427/103; 438/3, 54

(56) References Cited

U.S. PATENT DOCUMENTS

| | | |
|---|---|---|
| 5,465,475 A | 11/1995 | Kinoshita et al. |
| 5,507,080 A | 4/1996 | Hayashi et al. |
| 5,658,355 A | 8/1997 | Cottevieille et al. |
| 6,510,597 B2 | 1/2003 | Yoshida et al. |
| 2001/0037565 A1 | 11/2001 | Prasad et al. |

OTHER PUBLICATIONS

A. Goyal, et al. Material Characteristics of Perovskite Manganese Oxide Thin Films for Biometric Applications, Applied Physics Letters 71, Oct. 27, 1997, pp. 2535-2537.
Z. Trajanovic, et al. "Growth of Colossal Magnetoresistance Thin Films on Silicon," Applied Physics Letters 69, Aug. 12, 1998, pp. 1005-1007.

*Primary Examiner*—Timothy V. Eley
(74) *Attorney, Agent, or Firm*—William V. Adams

(57) ABSTRACT

A method of fabricating a colossal magneto-resistive detector using a thin film transfer method includes the use of a perovskite oxide material as a substrate, and a rock salt structure material as a buffer layer, template layer, and release layer. Advantages associated with the method include not only the ability to produce a detector of the requisite film quality, but one which satisfies the temperature coefficient of resistance and fabrication temperature constraints. In addition, when employed as either the substrate or the buffer layer, template layer, and release layer, after bonding the rock salt structure material can be easily removed using water, and the excess rock salt structure material/water solution can then be removed with known techniques.

9 Claims, 11 Drawing Sheets

METHOD OF FABRICATING A COLOSSAL MAGNETO-RESISTIVE DETECTOR USING A THIN FILM TRANSFER METHOD

CROSS-REFERENCE TO RELATED APPLICATIONS

This application is a division of U.S. patent application Ser. No. 09/550,623, filed on Apr. 17, 2000 which will issue as U.S. Pat. No. 6,708,392 on 23 Mar. 2004 which is herein incorporated by reference in its entirety.

GOVERNMENT INTEREST

The invention described herein may be manufactured and used by or for the Government of the United States of America for government purposes without the payment of any royalties therefor.

BACKGROUND OF THE INVENTION

1. Field of the Invention

This invention relates generally to uncooled infrared detectors and focal plane arrays, and more specifically to a method of fabricating a detector using rock salt as a removable substrate. The invention relates even more specifically to a method of fabricating a colossal magneto-resistive detector using a rock salt structure material.

2. Description of Related Art

Uncooled infrared thermal detectors have recently been developed into large-size focal plane arrays (hereinafter "FPA"). Use of a microbolometer is one successful method for infrared detection at room temperature. A microbolometer-type FPA typically employs vanadium oxide on silicon nitride with a micro-mechanically machined air bridge structure. The temperature coefficient of resistance for vanadium oxide is approximately 2%. The air bridge structure is built directly on a silicon readout integrated circuit ("ROIC"). Growth of detector materials directly on the ROIC restricts the material thin film growth temperature to less than 550° C. as a result of the thermal budget limitation associated with the ROIC.

The use of colossal magneto-resistive ("CMR") materials for uncooled infrared detectors is described in Goyal et al., A., AMaterial Characteristics of Perovskite Manganese Oxide Thin Films for Bolometric Applications, ' *Applied Physics Letters*, Vol. 71 (17) (27 Oct. 1997), pp. 2535–2537. CMR materials demonstrate an exceptionally large change in resistance with temperature as they transition from a ferromagnetic to a non-ferromagnetic phase. The transition temperature can be adjusted through appropriate selection of materials and process conditions. The results have demonstrated the feasibility of growing CMR thin films on perovskite oxide material substrates such as $LaAlO_3$ and $SrTiO_3$ with a resultant temperature coefficient of resistance of greater than 7%. However, the temperature for growth of the CMR material, however, must be relatively high (i.e., greater than 700° C.), which makes it difficult to grow directly on the ROIC.

CMR materials have a perovskite crystal structure with a square base. The lattice constant "a" of the square base of a CMR material is approximately 3.8 to 3.9 Å depending on the material composition. As indicated above, CMR thin films have been successfully grown on perovskite oxide substrates such as $LaAlO_3$ and $SrTiO_3$, and exhibit a good crystal orientation and a high temperature coefficient of resistance. These perovskite oxide substrate materials are employed because of the correspondence of their crystal structure and lattice constant to those of CMR materials. For example, $SrTiO_3$ has a cubic crystal structure with a lattice constant of 3.905 Å, and $LaAlO_3$ has a pseudo-cubic crystal structure with a lattice constant of 3.79 Å. These properties facilitate the growth of a CMR material on $LaAlO_3$ and $SrTiO_3$ with a resultant high crystal orientation and quality. The detector material can be bonded to a ROIC, then the substrate is removed. A disadvantage associated with use of these materials, however, is that both $LaAlO_3$ and $SrTiO_3$ are very difficult to remove by etching once the detector array has been bonded to the ROIC.

Therefore, a general need exists to provide a method of fabricating an uncooled infrared detector which both satisfies the temperature coefficient of resistance and fabrication temperature constraints, and also provides a detector of the requisite film quality. An even more specific need exists to provide a CMR transferred thin film method in which the substrate can be easily removed.

SUMMARY OF THE INVENTION

It is an object of the present invention to provide a method of fabricating an uncooled infrared detector that produces a detector of the requisite film quality, satisfies the temperature coefficient of resistance, and easy to fabricate. Accordingly, in a first preferred embodiment, the present invention advantageously relates to a method of fabricating a CMR detector using a thin film transfer method with a rock salt structure material as a substrate. The method comprises (a) growing a protective layer comprising a lattice matched template material so as to envelop a rock salt structure material substrate; (b) depositing a colossal magneto-resistive layer on a deposition surface of the protective layer; (c) fabricating a detector array (d) bond the detector array to a ROIC; and (e) removing the rock salt structure material substrate from the bonded structure.

By using a rock salt structure material such as, for example, NaCl, LiF, NaF, KF, or KCl as the substrate, a high quality epitaxial CMR material with a high temperature coefficient of resistance can be fabricated. The substrate can be easily removed using water, and the excess rock salt structure material/water solution can then be removed by a method such as evaporation, triple-point, or freeze drying.

In a second preferred embodiment, the present invention relates to a method in which a perovskite oxide material such as, for example, $LaAlO_3$ or $SrTiO_3$ is employed as the substrate, and the rock salt structure material is employed as a buffer layer, template layer, and release layer. The method comprises (a) growing a rock salt structure material layer on a perovskite oxide material substrate; (b) growing a protective layer comprising a lattice matched template material on the rock salt structure material layer; (c) depositing a colossal magneto-resistive layer on the protective layer; (d) fabricating a detector array; (e) bonding the detector array to a ROIC; (f) removing the rock salt structure material with water or other solution; and (g) the substrates falls off and is removed.

By employing either of the aforementioned embodiments, the growth and processing temperatures can be higher than those associated with a conventional technique in which the CMR material is grown directly on top of the ROIC, thus yielding a CMR material of higher quality and higher crystal orientation, and higher temperature coefficient of resistance.

Advantages associated with the embodiments of the present method include not only the ability to produce a detector of the requisite film quality, but one which satisfies the temperature coefficient of resistance and fabrication temperature constraints. In addition, once the fabrication is complete, the substrate can be easily removed.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be disclosed in terms of the currently perceived preferred embodiments thereof.

To facilitate the growth of materials with the desired crystal orientation for use in infrared detectors, a basic epitaxial relation and lattice match must exist between the substrate material and the CMR material. Rock salt structure materials have cubic crystal structures with lattice constants suitable for the growth of such CMR materials.

CMR materials have perovskite structures with an a and a b lattice constant of approximately 3.8 to 3.9 Å. Rock salt has a cubic crystal structure. LiF has a lattice constant a=4.02 Å, which matches CMR material very well, with only slight tensile strain. NaCl has a lattice constant a=5.64 Å, hence, to match the lattice constant, CMR materials may be grown epitaxially, but with slight tensile strain along the <110> direction of the NaCl. KF has a lattice constant a=5.34758 Å, hence, to match the lattice constant, CMR materials may be grown epitaxially, but with slight compressive strain along the <10> direction of the KF.

Figure 1A:
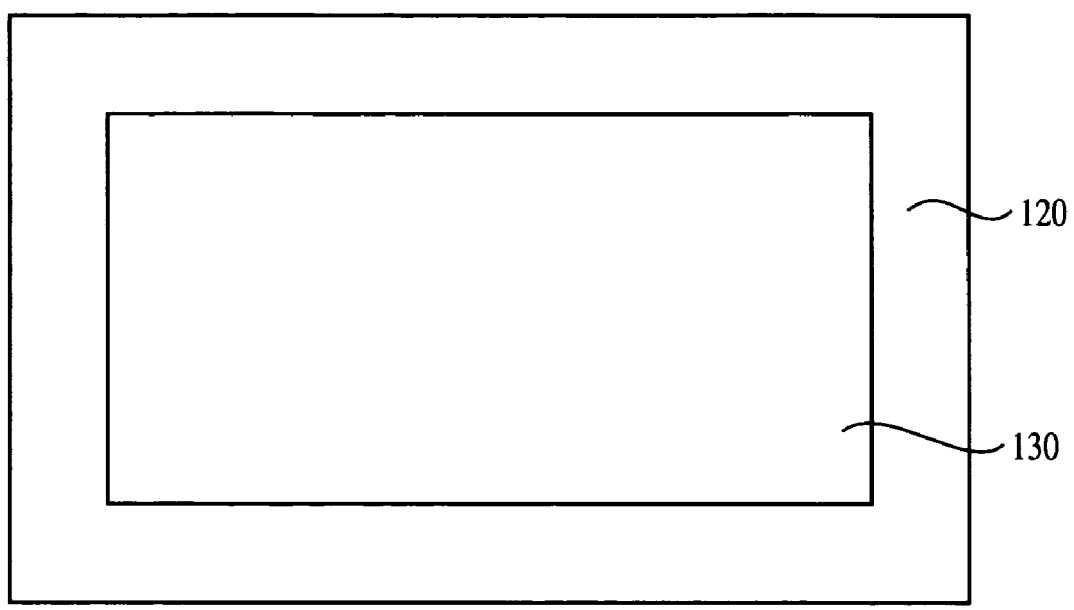
FIGS. 1A–D are schematic representations of a detector constructed in accordance with a first preferred embodiment of the invention comprising a rock salt structure material as a substrate.

Therefore, when a rock salt structure material is used as a substrate, CMR materials can be grown directly on such a substrate. FIGS. 1A–D are schematic representations of a detector 110 (FIG. 1D) constructed in accordance with a first preferred embodiment of the invention comprising a rock salt structure material as a substrate. The method of fabricating detector 110 comprises the following series of steps. First, a protective layer 120 comprising a lattice matched template material, such as, for example, a colossal magneto-resistive material, is grown so as to envelop a rock salt structure material substrate 130 (FIG. 1A). Substrate 130 comprises either rock salt (i.e., NaCl) or a material having the structure of rock salt such as, for example, LiF, NaF, KF, or KCl. In a preferred embodiment, LiF is employed as the rock salt structure material.

Figure 1B:
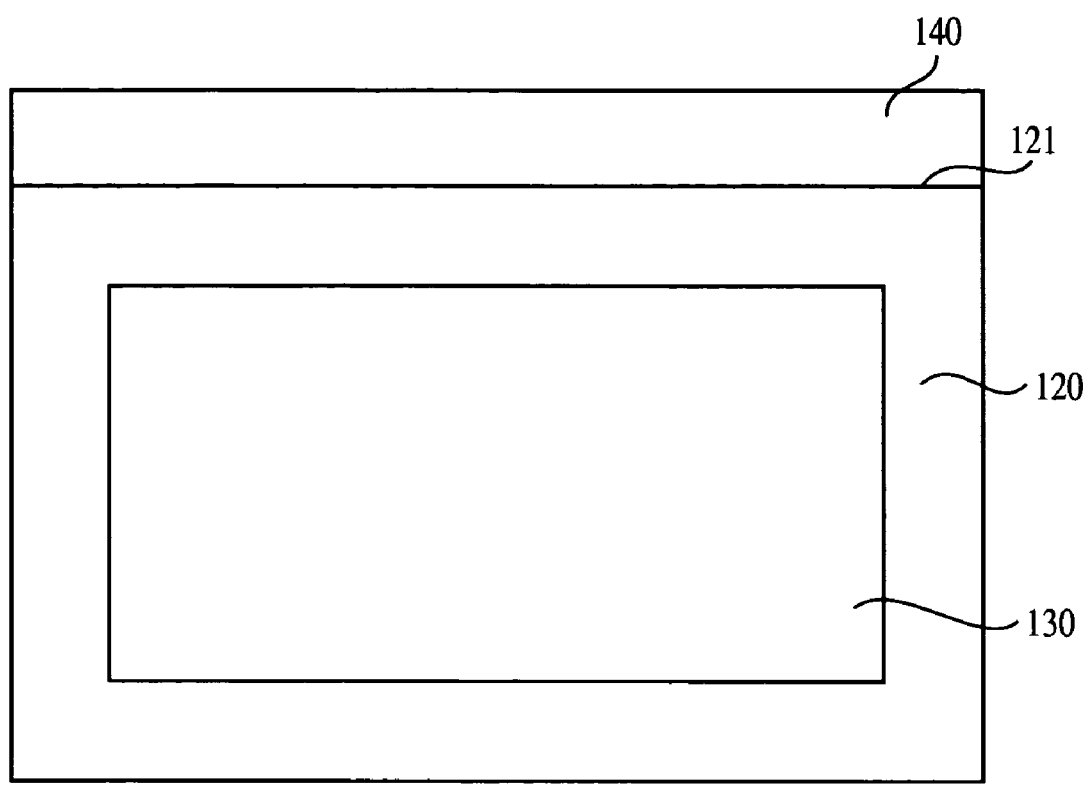
Figure 1C:
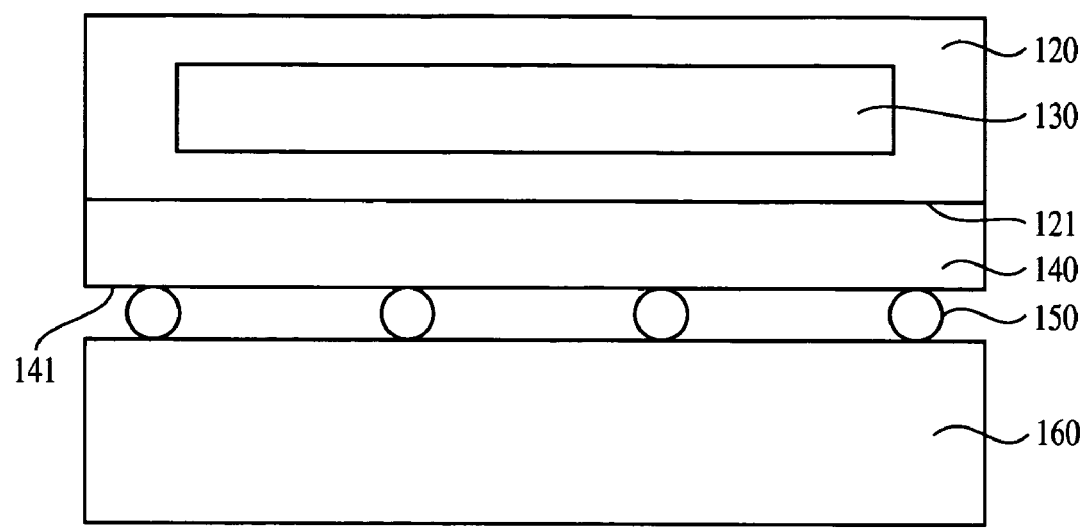

Next, a colossal magneto-resistive layer 140 is deposited on a deposition surface 121 of protective layer 120 (FIG. 1B). A detector array is fabricated by adding contacts and processing devices 150 to an interconnect surface 141 of colossal magneto-resistive layer 140, and a bonded structure is fabricated by bonding the detector array to a circuit 160 such as a readout integrated circuit (FIG. 1C).

Figure 1D:
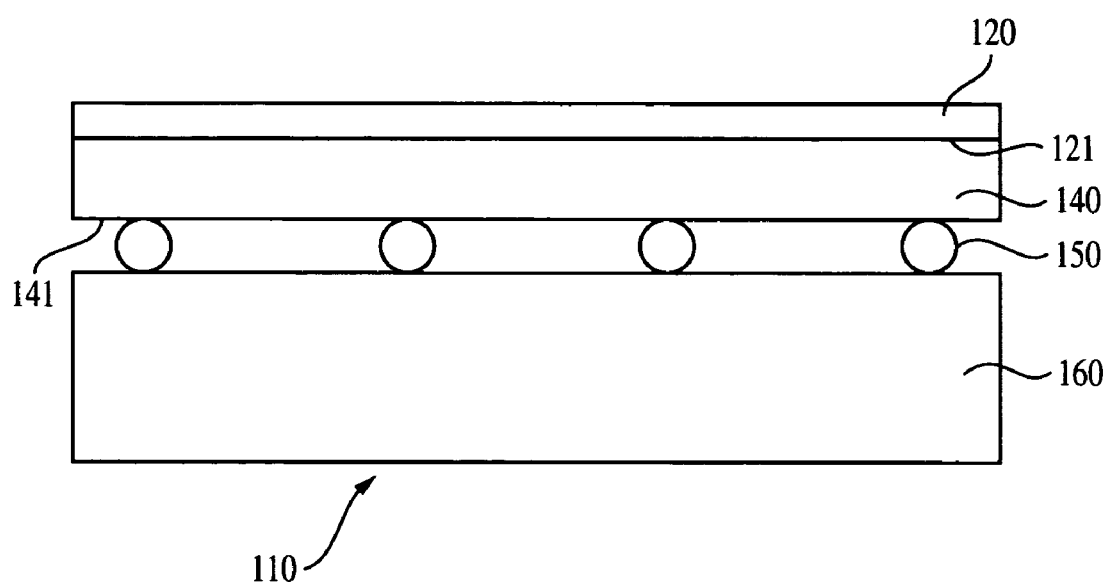

Finally, rock salt structure material substrate 130 is removed from the bonded structure (FIG. 1D). Removal of rock salt structure material substrate 130 can be accomplished by dissolving the rock salt structure material substrate in water. Excess rock salt structure material/water solution can then be removed by a water rinse and a method such as evaporation, triple-point, or freeze drying.

By growing protective layer 120 so as to envelop rock salt structure material substrate 130, the rock salt structure material substrate is protected so that photolithography or mesa etching can be employed in an optional further step to remove protective layer 120. If photolithography is employed, it is recommended that pure alcohol be used. If mesa etching is employed, it is recommended that dry etching be used.

Figure 2A:
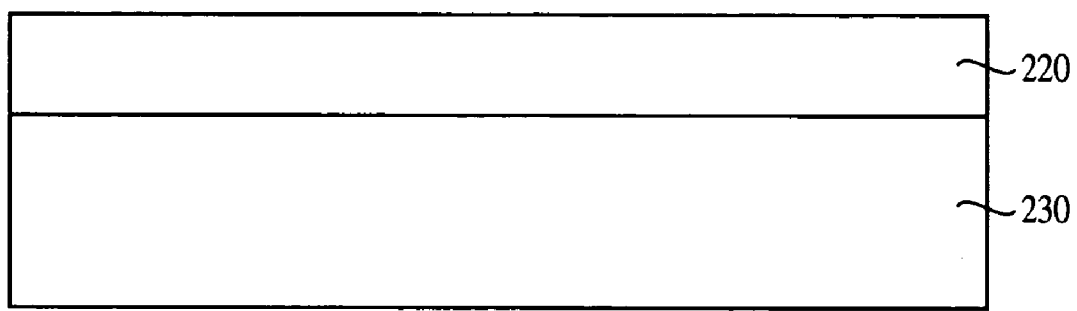
FIGS. 2A–E are schematic representations of a detector constructed in accordance with a second preferred embodiment of the invention comprising a perovskite oxide material as the substrate and a rock salt structure material as the buffer layer, template layer, and release layer.
Figure 2B:
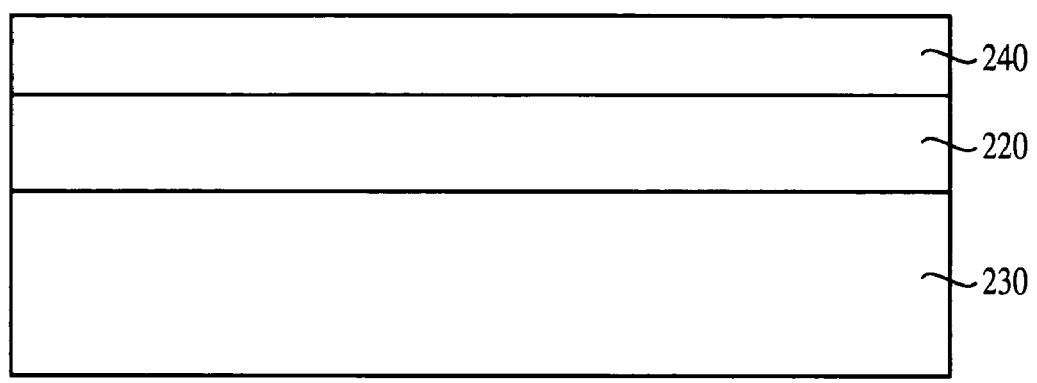

FIGS. 2A–E are schematic representations of a detector 210 (FIG. 2E) constructed in accordance with a second preferred embodiment of the invention comprising a perovskite oxide material as the substrate and a rock salt structure material as the buffer layer, template layer, and release layer. The method of fabricating detector 210 comprises the following series of steps. First, a rock salt structure material layer 220 is grown on a perovskite oxide material substrate 230 (FIG. 2A). Layer 220 comprises either rock salt (i.e., NaCl) or a material having the structure of rock salt such as, for example, LiF, NaF, KF, or KCl. In a preferred embodiment, LiF is employed as the rock salt structure material. Substrate 230 comprises a perovskite oxide material such as, for example, $SrTiO_3$ or $LaAlO_3$.

Figure 2C:
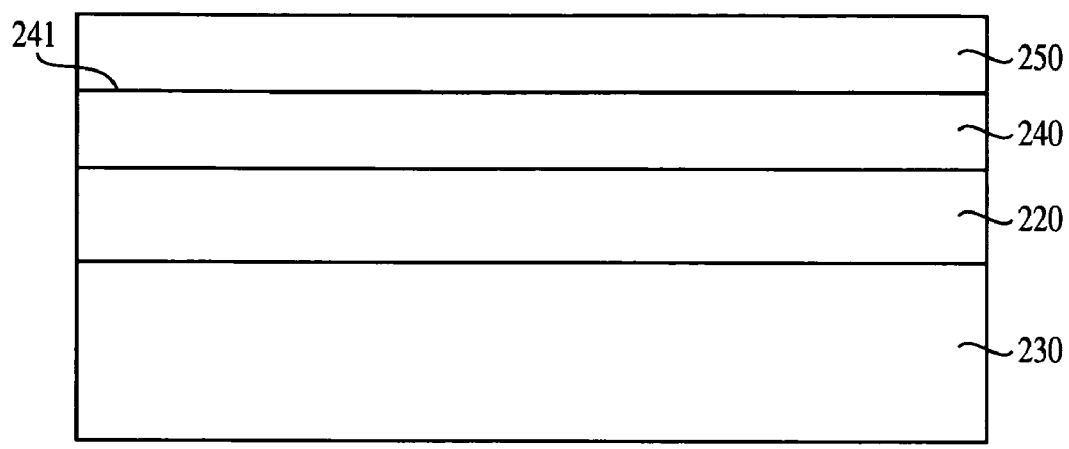
Figure 2D:
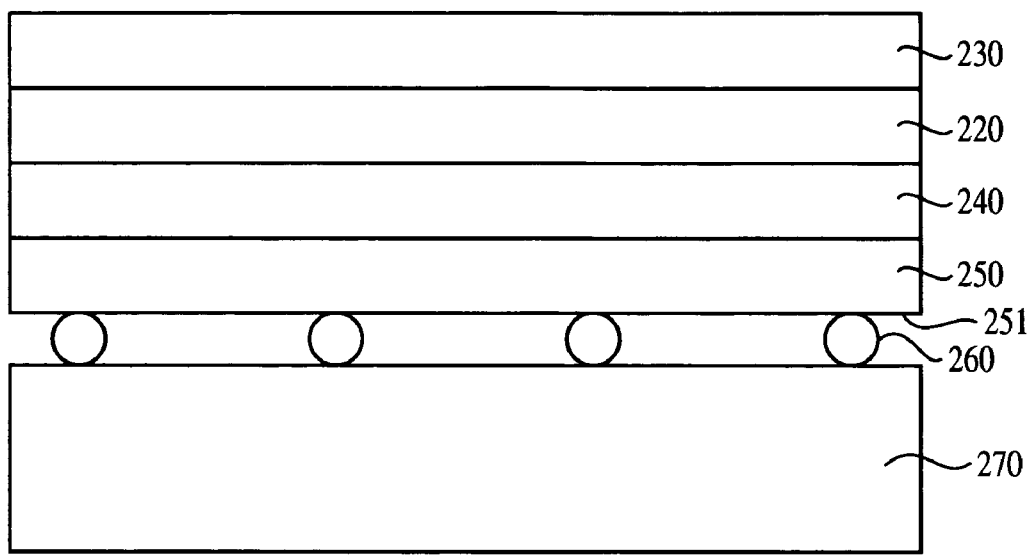

Next, a protective layer 240 comprising a lattice matched template material is grown on rock salt structure material layer 220 (FIG. 2B), followed by the deposition of a colossal magneto-resistive layer 250 on a deposition surface 241 of protective layer 240 (FIG. 2C). A detector array is fabricated by adding contacts and processing devices 260 to an interconnect surface 251 of colossal magneto-resistive layer 250, and a bonded structure is fabricated by bonding the detector array to a circuit 270 such as a readout integrated circuit (FIG. 2D).

Figure 2E:
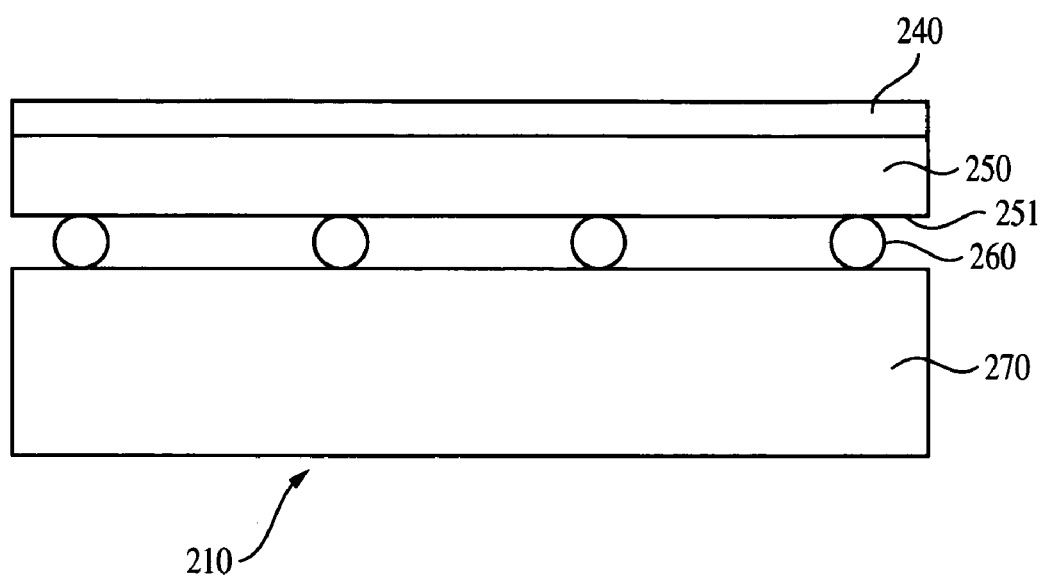

Finally, perovskite oxide material substrate 230 is removed from rock salt structure material layer 220, and rock salt structure material substrate 220 is removed from protective layer 240 (FIG. 2E). Removal of rock salt structure material layer 220 can be accomplished by dissolving the rock salt structure material layer in water. Excess rock salt structure material/water solution can then be removed by a water rinse and a method such as evaporation, triple-point, or freeze drying.

In an optional further step, photolithography or mesa etching can be employed to remove protective layer 240. If photolithography is employed, it is recommended that pure alcohol be used. If mesa etching is employed, it is recommended that dry etching be used.

EXAMPLE

Figure 3:
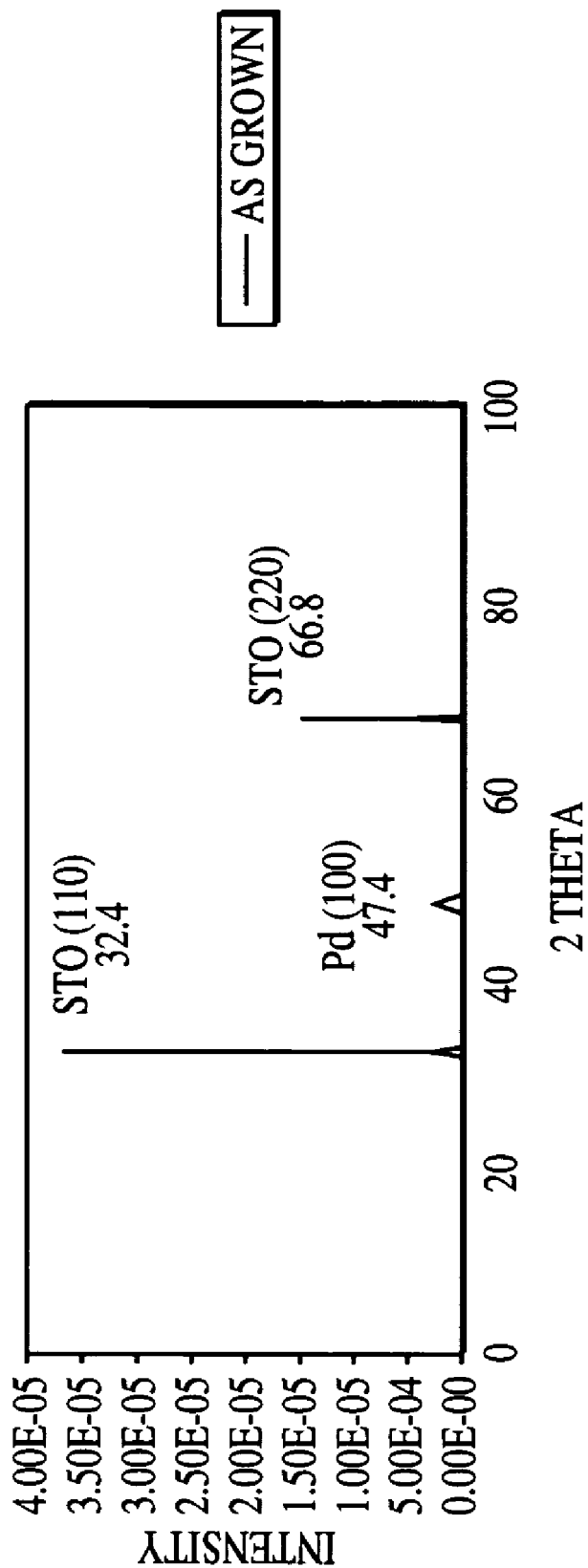
FIG. 3 is a graphical representation of a pre-substrate removal x-ray diffraction pattern associated with an embodiment of the present invention in which $SrTiO_3$ was deposited on NaCl with Pd as a thin buffer layer.

FIG. 3 is a graphical representation of a pre-substrate removal x-ray diffraction pattern associated with an embodiment of the present invention in which an $SrTiO_3$ film was deposited on NaCl with Pd serving as a thin buffer layer. The embodiment represented by the graph depicted in FIG. 3 shows strong crystal (110) orientation before the substrate removal.

Figure 4:
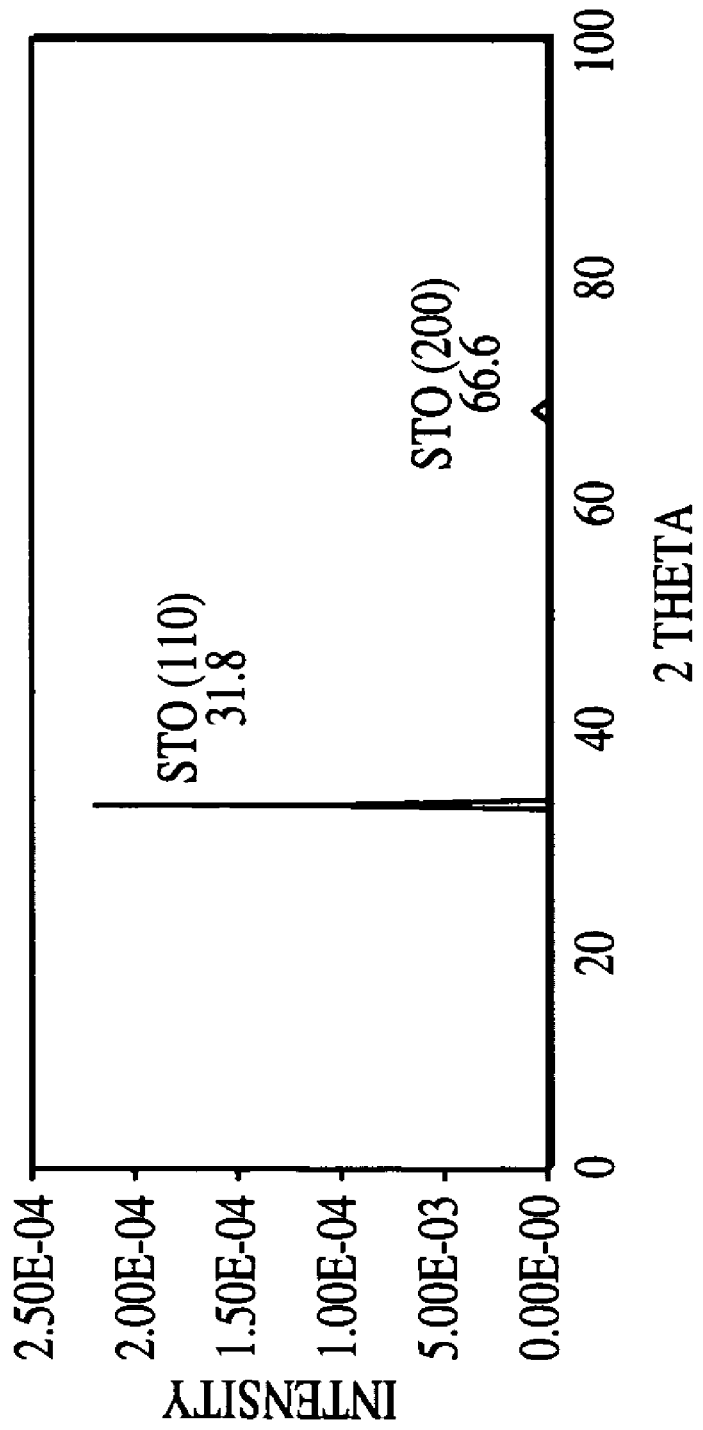
FIG. 4 is a graphical representation of a post-substrate removal x-ray diffraction pattern associated with the embodiment depicted in FIG. 3.

FIG. 4 is a graphical representation of a post-substrate removal x-ray diffraction pattern associated with the embodiment depicted in FIG. 3. The x-ray diffraction pattern shows that the strong crystal orientation of the SrTiO$_3$ film remained even after the NaCl substrate had been removed.

The embodiments of the present invention, therefore, provide a method of fabricating a CMR detector using a thin film transfer method with a rock salt structure material employed as either a substrate in a first preferred embodiment, or as a buffer layer, template layer, and release layer in a second preferred embodiment. Advantages associated with the method include not only the ability to produce a detector of the requisite film quality, but one which satisfies the temperature coefficient of resistance and fabrication temperature constraints.

While only certain preferred embodiments of this invention have been shown and described by way of illustration, many modifications will occur to those skilled in the art. For example, while the method has been described in the context of a colossal magneto-resistive detector application, it is equally applicable to any service requiring a high quality film produced by a thin film transfer method which uses an easily removable material as either a substrate or as a layer. By way of further example of modifications within the scope of this invention, while the method has been described in the first and second preferred embodiments respectively as comprising the use of a single rock salt structure material substrate or layer, another embodiment could comprise the use of a plurality of the aforementioned substrates or layers.

It is, therefore, desired that it be understood that it is intended herein to cover all such modifications that fall within the true spirit and scope of this invention.

What is claimed is:

1. A method of fabricating a colossal magneto-resistive detector using a thin film transfer method, said method of fabricating comprising:
    (a) growing a rock salt structure material layer on a perovskite oxide material substrate;
    (b) growing a protective layer comprising a lattice matched template material on said rock salt structure material layer;
    (c) depositing a colossal magneto-resistive layer on said protective layer;
    (d) fabricating a detector array by adding contacts and processing devices to an interconnect surface of said colossal magneto-resistive layer;
    (e) fabricating a bonded structure by bonding said detector array to a circuit;
    (f) removing said perovskite oxide material substrate from the rock salt structure material layer; and
    (g) removing said rock salt structure material layer from the protective layer.

2. A method according to claim 1, wherein said perovskite oxide material substrate is a material selected from the group consisting of LaAlO$_3$ and SrTiO$_3$.

3. A method according to claim 1, wherein said rock salt structure material substrate is a material selected from the group consisting of NaCl, LiF, NaF, KF, and KCl.

4. A method according to claim 1, wherein said lattice matched template material is a colossal magneto-resistive material.

5. A method according to claim 1, wherein said circuit is a readout integrated circuit.

6. A method according to claim 1, wherein step (f) comprises an etching method.

7. A method according to claim 1, wherein step (g) comprises dissolving said rock salt structure material substrate in water, and said method further comprises:
    (h) removing excess rock salt structure material/water solution.

8. A method according to claim 7, wherein step (h) is carried out by a water rinse and a method selected from the group consisting of evaporation, triple-point, and freeze drying.

9. A method according to claim 1, further comprising: removing said protective layer by etching.

* * * * *